(12) United States Patent
Ishii et al.

(10) Patent No.: US 12,480,851 B2
(45) Date of Patent: Nov. 25, 2025

(54) METHOD FOR DIAGNOSING FILM DEGRADATION

(71) Applicant: ASHIGARA MANUFACTURING INC., Kanagawa (JP)

(72) Inventors: Terumitsu Ishii, Kanagawa (JP); Daisuke Yamamoto, Kanagawa (JP)

(73) Assignee: ASHIGARA MANUFACTURING INC., Kanagawa (JP)

( * ) Notice: Subject to any disclaimer, the term of this patent is extended or adjusted under 35 U.S.C. 154(b) by 445 days.

(21) Appl. No.: 17/774,747

(22) PCT Filed: Nov. 4, 2020

(86) PCT No.: PCT/JP2020/041174
§ 371 (c)(1),
(2) Date: May 5, 2022

(87) PCT Pub. No.: WO2021/090826
PCT Pub. Date: May 14, 2021

(65) Prior Publication Data
US 2022/0364966 A1     Nov. 17, 2022

(30) Foreign Application Priority Data
Nov. 6, 2019   (JP) .................................. 2019-201421

(51) Int. Cl.
*G01N 3/08*    (2006.01)
*G01N 21/35*   (2014.01)
(Continued)

(52) U.S. Cl.
CPC ............... *G01N 3/08* (2013.01); *G01N 21/35* (2013.01); *G01N 31/168* (2013.01);
(Continued)

(58) Field of Classification Search
CPC ........ G01N 3/08; G01N 21/35; G01N 31/168; G01N 31/221; G01N 31/222;
(Continued)

(56) References Cited

U.S. PATENT DOCUMENTS

| | | | | |
|---|---|---|---|---|
| 4,801,407 A | * | 1/1989 | Hignett | A01N 37/16 252/186.1 |
| 5,443,921 A | * | 8/1995 | Hosokawa | H05B 3/14 428/917 |

(Continued)

FOREIGN PATENT DOCUMENTS

| | | | | |
|---|---|---|---|---|
| EP | 3312227 A1 | * | 4/2018 | ............... C08B 3/06 |
| JP | S60-117151 A | | 6/1985 | |

(Continued)

OTHER PUBLICATIONS

Extended European Search Report issued in EP Patent Application No. 208846642, Nov. 2, 2023.

(Continued)

*Primary Examiner* — Fatemeh Esfandiari Nia
(74) *Attorney, Agent, or Firm* — GREENBLUM & BERNSTEIN, P.L.C.

(57) ABSTRACT

An object of the present invention is to provide a novel method for diagnosing film degradation which can identify the degraded state of a film based on a resin more efficiently and reliably than ever. In order to attain this object, a method for diagnosing the degradation of a film based on a resin is adopted, the method comprising using the following analysis method A and/or analysis method B, which is a non-destructive analysis method: analysis method A: confirming the presence or absence of abnormality in the film by visual observation and olfactometry, and analysis method B: confirming the presence or absence of an acid anhydride and a (Continued)

sign of hydrolysis reaction as to the film by Fourier transform infrared spectroscopy analysis.

4 Claims, 17 Drawing Sheets

(51) Int. Cl.
    *G01N 31/16*     (2006.01)
    *G01N 31/22*     (2006.01)
    *G01N 33/00*     (2006.01)

(52) U.S. Cl.
    CPC ......... *G01N 31/221* (2013.01); *G01N 31/222* (2013.01); *G01N 31/223* (2013.01); *C08J 2301/12* (2013.01); *G01N 2021/3595* (2013.01); *G01N 33/0096* (2024.05); *G01N 2203/0282* (2013.01)

(58) Field of Classification Search
    CPC ............. G01N 31/223; G01N 33/0096; G01N 2021/3595; G01N 2203/0282; G01N 2030/884; G01N 21/8422; G01N 33/442; C08J 2301/12; G03C 11/06; G03C 2001/7952

See application file for complete search history.

(56) References Cited

U.S. PATENT DOCUMENTS

| | | | |
|---|---|---|---|
| 2005/0287675 | A1 | 12/2005 | Packard |
| 2009/0181937 | A1* | 7/2009 | Faucher ................. A61L 31/148 514/183 |
| 2011/0273708 | A1* | 11/2011 | Tong .................. G01N 21/3504 356/311 |
| 2018/0100848 | A1 | 4/2018 | Kastner |
| 2018/0244834 | A1* | 8/2018 | Webster ............. C08G 59/4207 |
| 2019/0106639 | A1* | 4/2019 | Rovani, Jr. .......... G01N 30/461 |

FOREIGN PATENT DOCUMENTS

| | | | | |
|---|---|---|---|---|
| JP | 2002-311019 | A | | 10/2002 |
| JP | 2005-308424 | A | | 11/2005 |
| JP | 2009-257838 | A | | 11/2009 |
| JP | 2012-58109 | A | | 3/2012 |
| KR | 10-2016-0115060 | A | | 10/2016 |
| WO | WO-2010055903 | A1 * | 5/2010 | ................ C08J 5/18 |
| WO | WO-2020090818 | A1 * | 5/2020 | ........... B32B 15/085 |

OTHER PUBLICATIONS

A. Tulsi Ram et al.: "Simulated Aging of Processed Cellulose Triacetate Motion Picture Films", Journal of Imaging Science and Technology, vol. 36, No. 1, Jan./Feb. 1992, pp. 21-28.

Liu Liu et al., "Degradation markers and plasticizer loss of cellulose acetate films during ageing", Polymer Degradation and Stability 168 (2019) pp. 1-8 XP085831209.

Emanuel Lorrain: "A short guide to identify nitrate films and vinegar syndrome degradation in audio-visual collections and archives", Apr. 2013 pp. 1-4 XP093094192.

Myke Tymons "Vinegar Syndrome in Negatives", Presbyterian Research, May 18, 2012 XP093094206.

Office Action issued in Japanese Patent Application No. 2021-554948, issued Jun. 6, 2024, translation.

Takahashi, K. et al., "Identification of white precipitate from damaged triacetate base movie films-chemical analysis of "Vinegar Syndrome (1)"", The Academic Reports, the Faculty of Engineering, Tokyo Polytechnic University, vol. 36, 2013, pp. 27-33, with partial English translation.

Allen, N.S. et al., "Acid-catalysed degradation of historic cellulose triacetate, cinematographic film: influence of various film parameters", Eur. Polym. J., vol. 24, 1988, pp. 707-712.

Richardson, E. et al., "Assessing the physical stability of archival cellulose acetate films by monitoring plasticizer loss", Polymer Degradation and Stability, vol. 107, 2014, pp. 231-236.

Yamamoto, D., "Deterioration Diagnosis of Triacetyl Cellulose Base Used in Photography by Chemical Analysis", vol. 17, Nov. 29, 2019, pp. 17-24, with English translation.

E. Francais, "The Safe and Accurate Way to Check Film for Vinegar Syndrome," Image Permanence Institute, Rochester Institute of Technology, Jan. 1998, pp. 1-20.

M.T. Giachet, M. Schilling, K. McCormick, J. Mazurek, E. Richardson, H. Khanjian, T. Learner, "Assessment of the composition and condition of animation cels made from cellulose acetate," Polymer Degradation and Stability, vol. 107, 2014, pp. 223-230.

International Search Report issued in International Patent Application No. PCT/JP2020/041174, dated Jan. 12, 2021, along with an English translation thereof.

International Preliminary Report on patentability issued in International Patent Application No. PCT/JP2020/041174, dated May 10, 2022, along with an English translation thereof.

Office Action issued in Japanese Patent Application No. 2021-554948, issued Oct. 28, 2024, translation.

\* cited by examiner

METHOD FOR DIAGNOSING FILM DEGRADATION

TECHNICAL FIELD

The present invention relates to a method for diagnosing film degradation. Particularly, the present invention relates to a method for diagnosing degradation of a film for record conservation based on a resin.

BACKGROUND ART

Films for record conservation based on a resin (hereinafter, simply referred to as "resin films") have heretofore been used in forms such as "motion-picture films", "microfilms", "photograph films", or "magnetic record films" for recording various historical materials, documents, and the like and conserving these. Films using, particularly, triacetyl cellulose (TAC), as a base material (hereinafter, referred to as "TAC films") among resins are called safety films because of their high flame resistance as compared with nitrocellulose films used in the past, and have been claimed to be capable of being conserved even for 100 years or longer.

However, it has become clear in recent years that a phenomenon called vinegar syndrome occurs in a usual conservation environment so that degradation starts in approximately 30 years even if TAC films are used. In the case of conserving TAC films in a high-temperature and high-humidity environment, the hydrolysis of TAC is caused by temperature and humidity, etc. An acetic acid gas generated in association with the hydrolysis of TAC works as a catalyst to accelerate the hydrolysis reaction of TAC. The vinegar syndrome refers to such a rapid degradation phenomenon of films resulting from the hydrolysis of TAC.

Not only the phenomenon called vinegar syndrome mentioned above but oxidation reaction, the elution of plasticizers, cracking in image quality layers, etc. might degrade TAC films and thereby impair information recorded in the TAC films. Accordingly, various approaches have heretofore been adopted to diagnose the degradation of resin films including TAC.

For example, Non Patent Literature 1 describes a method using a paper strip allowed to contain bromocresol green sodium salt. Specifically, the method described in Non Patent Literature 1 involves placing the paper strip together with a TAC film in a film conservation can, and detecting the presence or absence of acetic acid gas inside the conservation can from change in the color of the paper strip after a lapse of a given time.

Patent Literature 1 describes a method using a glass detection tube packed with inorganic particles coated with sodium metasilicate and cresol red. Specifically, the method described in Patent Literature 1 involves determining an acetic acid gas concentration from the amount of change in the color of the particles inside the glass detection tube when surrounding gases of a film conservation can are injected to the glass detection tube.

Non Patent Literature 2 states that: as the degradation of a TAC film progresses, a moisture content of the TAC film increases and the surface pH of the TAC film decreases. Specifically, the method described in Non Patent Literature 2 involves confirming a moisture content of a TAC film, or confirming the presence or absence of acetic acid attached to the TAC film by pH measurement.

Non Patent Literature 3 states that in causing accelerated degradation of a TAC film plasticized with diethyl phthalate, a decreased plasticizer content in the TAC film can be confirmed by thermogravimetry/differential thermal analysis (hereinafter, referred to as "TG-DTA") and Fourier transform infrared spectroscopy (hereinafter, referred to as "FT-IR") analysis. Specifically, the method described in Non Patent Literature 3 involves confirming the heat stability of the TAC film by TG-DTA analysis, or confirming the presence or absence of an acid anhydride and a sign of hydrolysis reaction by FT-IR analysis.

Non Patent Literature 4 states that when a TAC film time-dependent degraded in an environment of room temperature is analyzed, a phthalic acid ester-based plasticizer is eluted onto the surface of the TAC film and then detected as white crystals through hydrolysis. Specifically, the method described in Non Patent Literature 4 involves confirming the presence or absence of white crystals eluted on TAC film surface.

Non Patent Literature 5 states that a plasticizer contained in a TAC film is analyzed by pyrolysis gas chromatography mass spectrometry (hereinafter, referred to as "Py-GC/MS") analysis or a solvent extraction method and the degraded state of the film can be estimated from a residual component of the plasticizer. Specifically, the method described in Non Patent Literature 5 involves confirming a plasticizer species in a TAC film by Py-GC/MS analysis.

CITATION LIST

Patent Literature

[Patent Literature 1] Japanese Patent Laid-Open No. 2009-257838

Non Patent Literature

[Non Patent Literature 1] E. Fran▲c▼ais, "The Safe and Accurate Way to Check Film for Vinegar Syndrome", Image Permanence Institute, Rochester, NY (2001).

[Non Patent Literature 2] N. S. Allen, M. Edge, J. H. Appleyard, T. S. Jewitt, C. V. Horie, D. Francis, "Acid-catalysed degradation of historic cellulose triacetate, cinematographic film: Influence of various film parameters", Eur. Polym. J., 24(8), 707-712, (1988).

[Non Patent Literature 3] E. Richardson, M. T. Giachet, M. Schilling, T. Learner, "Assessing the physical stability of archival cellulose acetate films by monitoring plasticizer loss", Polym. Degrad. Stabil., 107, 231-236 (2014).

[Non Patent Literature 4] Keiko Takahashi, Hiroshi Hayakawa, Tomohiro Okamoto, Shoji Fujiwara, Hitoshi Yajima, "Identification of white precipitate from damaged triacetate base movie films—chemical analysis of "Vinegar Syndrome" (1)", The Academic Reports, the Faculty of Engineering, Tokyo Polytechnic University, 36 (1), 27-33 (2013)

[Non Patent Literature 5] M. T. Giachet, M. Schilling, K. McCormick, J. Mazurek, E. Richardson, H. Khanjian, T. Learner, "Assessment of the composition and condition of animation cells made from cellulose acetate", Polym. Degrad. Stabil., 107, 223-230 (2014).

SUMMARY OF INVENTION

Technical Problem

However, the methods described in Non Patent Literature 1 and Patent Literature 1, though being capable of conveniently detecting an acetic acid gas at low cost, have difficulty in accurately determining whether or not an acetic acid gas has been generated from a TAC film, because an acetic acid gas may enter into a film conservation can from an external environment. Besides, the methods described in Non Patent Literature 1 and Patent Literature 1 have difficulty in accurately detecting a sign of the start of film degradation other than vinegar syndrome, for example, oxidation reaction, the elution of plasticizers, or cracking in image quality layers. Moreover, the A-D Strips of Non Patent Literature 1 and the detection tube of Patent Literature 1 merely allow an acetic acid gas concentration to be approximated on the basis of color change.

The methods described in Non Patent Literature 2 and Non Patent Literature 3 force accelerated degradation of a TAC film at a high temperature and a high humidity. Reaction that occurs here is not always the same as reaction that occurs by time-dependent degradation at room temperature in an actual conservation site. Accordingly, the methods described in Non Patent Literature 2 and Non Patent Literature 3 might evaluate a state different from a degraded state in an actual conservation site.

Furthermore, a problem of the method described in Non Patent Literature 4 or Non Patent Literature 5 is that a definitive index for determining and/or diagnosing a degraded state has not been obtained.

Thus, an object of the present invention is to provide a novel method for diagnosing film degradation which can identify the degraded state of a resin film more efficiently and reliably than ever.

Solution to Problem

The present inventors have conducted diligent studies and consequently attained the object by adopting the following method for diagnosing film degradation. The method for diagnosing film degradation according to the present invention is a method for diagnosing degradation of a resin film, the method comprising using the following analysis method A and/or analysis method B, which is a non-destructive analysis method:

analysis method A: confirming presence or absence of abnormality in the resin film by visual observation and olfactometry, and analysis method B: confirming presence or absence of an acid anhydride and a sign of hydrolysis reaction as to the resin film by Fourier transform infrared spectroscopy analysis.

The method for diagnosing film degradation according to the present invention preferably comprises using the following analysis method C and/or analysis method D, which is a non-destructive analysis method, after using the analysis method A and/or the analysis method B:

analysis method C: confirming presence or absence of acetic acid attached to the resin film by pH measurement, and analysis method D: confirming a concentration of an acetic acid gas released from the film by high-performance liquid chromatography (hereinafter, referred to as "HPLC") analysis.

The method for diagnosing film degradation according to the present invention more preferably comprises using one of or a combination of two or more of the following analysis method E to analysis method H, which are destructive analysis methods, after using the non-destructive analysis method(s):

analysis method E: confirming a moisture content of the resin film with a Karl Fischer (hereinafter, referred to as "KF") moisture meter, analysis method F: confirming a heat stability of the resin film by thermogravimetry/differential thermal analysis, analysis method G: confirming a plasticizer species in the resin film by pyrolysis gas chromatography mass spectrometry, and analysis method H: confirming a mechanical strength of the resin film by a tensile test.

In the method for diagnosing film degradation according to the present invention, the resin film is preferably a triacetyl cellulose film.

Advantageous Effects of Invention

According to the present invention, the degraded state of a resin film can be identified more efficiently and reliably than ever.

DESCRIPTION OF EMBODIMENTS

Figure 1:
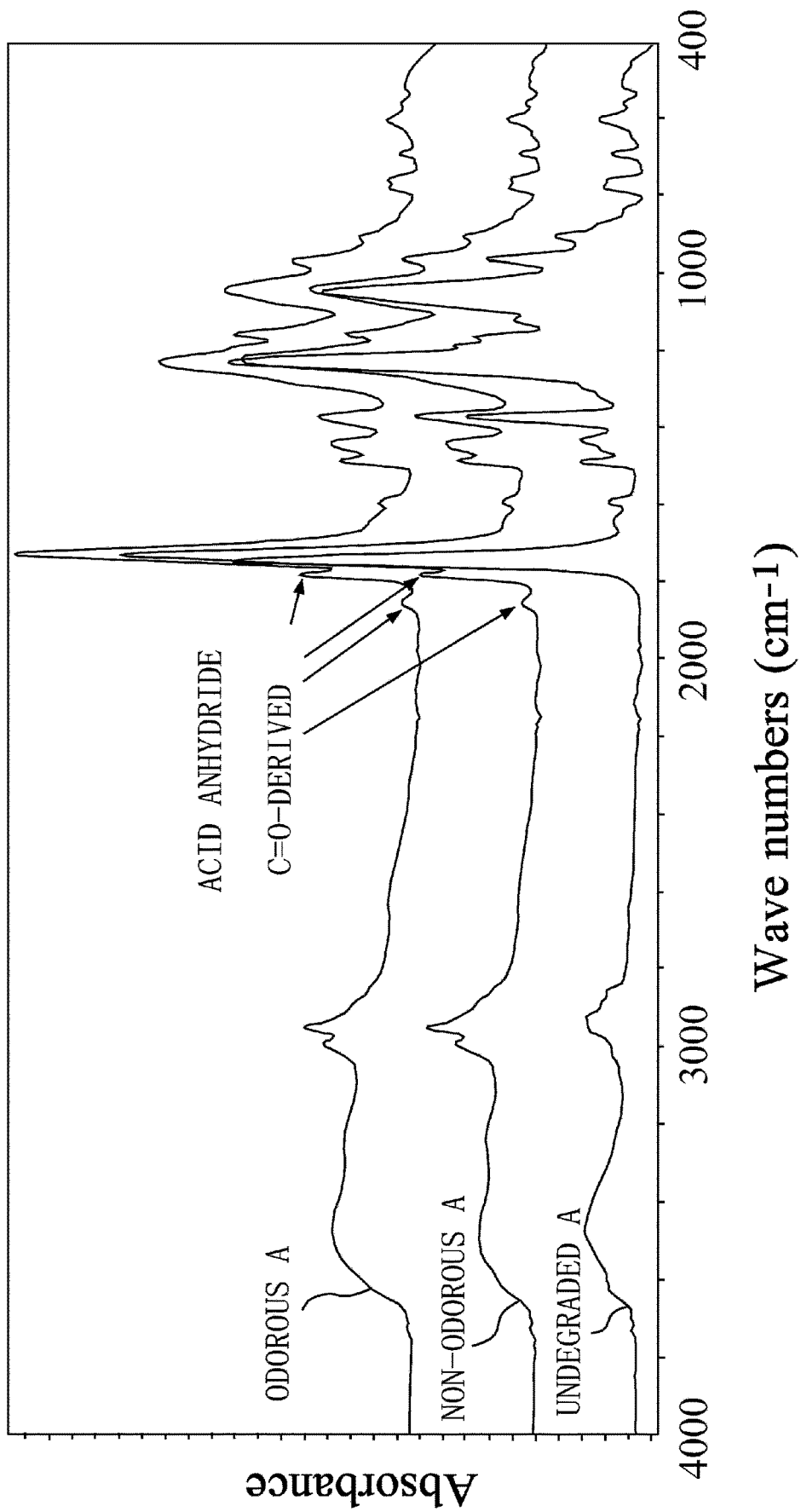
FIG. 1 is a diagram showing the FT-IR spectrum of the analysis method B according to the present embodiment.

Hereinafter, embodiments of the method for diagnosing film degradation according to the present invention will be described.

The method for diagnosing degradation of a film according to the present invention is a method for diagnosing degradation of a resin film, the method comprising using the following analysis method A and/or analysis method B, which is a non-destructive analysis method:

analysis method A: confirming the presence or absence of abnormality in the film by visual observation and olfactometry, and analysis method B: confirming the presence or absence of an acid anhydride and a sign of hydrolysis reaction as to the film by Fourier transform infrared spectroscopy (FT-IR) analysis.

In the method for diagnosing degradation of a film according to the present invention, at least any non-destructive analysis method of the analysis method A and the analysis method B is used. When the degradation of a film can be sufficiently confirmed by the analysis method A or the analysis method B, it is not necessary to perform analysis methods C to G given below. Accordingly, in the method for diagnosing film degradation according to the present invention, the analysis method A and/or the analysis method B is an essential analysis method. Hereinafter, these analysis methods A and B will be described.

(A) Regarding Analysis Method A

The analysis method A involves confirming the presence or absence of abnormality in the resin film by visual observation and olfactometry. Therefore, the degraded state of the resin film can be simply confirmed. In this context, the visual observation involves confirming the presence or absence of the elution of a plasticizer, the development of mold, etc. on film surface. If the resin film is remarkably degraded, the elution of a plasticizer, the development of mold, etc. occurs and can be easily confirmed even visually. The olfactometry involves collecting air within a container where the resin film is conserved, and confirming the presence or absence of abnormality using human's sense of smell. For example, when a TAC film is degraded, TAC releases an acetic acid gas through the hydrolysis reaction of TAC. This acetic acid thus generated produces acetic acid odor within the film conservation container. Provided that abnormal odor is produced to an extent that a human perceives the odor within the film conservation container, remarkable degradation of the resin film can be confirmed.

(B) Regarding Analysis Method B

The analysis method B involves confirming the presence or absence of an acid anhydride or a sign of hydrolysis as to the resin film by FT-IR analysis. Therefore, the degraded state of the resin film can be identified even if no abnormality is confirmed by the olfactometry of the analysis method A. For example, a TAC film might undergo the progression of hydrolysis or the precipitation or decomposition of a plasticizer, even in the absence of perceivable acetic acid odor. Hereinafter, the method for diagnosing film degradation using the analysis method B will be described in detail with reference to embodiments.

In the analysis method B according to the present embodiment, FT-IR Nicolet iS50 manufactured by Thermo Fisher Scientific K.K. was used as an apparatus. Measurement conditions involved a resolution of 4 $cm^{-1}$, 32 scans, a measurement wave number in the range of 500 $cm^{-1}$ to 4000 $cm^{-1}$, and automatic atmospheric correction turned on, and diamond was used as crystals. The base side of a TAC film was measured by attenuated total reflection (ATR). Then, the obtained spectrum was subjected to ATR correction at settings of an incidence angle of 45° C., 1 refection, and a refractive index of 1.5.

Undegraded films and degraded films were used as TAC films for use in measurement in the analysis method B according to the present embodiment. In this context, films in which a sign of degradation was confirmed visually and by a sense of smell by the analysis method A and was consequently unable to be confirmed (undegraded A to C (developed in 2010 or later)) were provided as the undegraded films. Also, films in which a sign of degradation was confirmed visually and by a sense of smell by the analysis method A and was consequently unable to be confirmed (non-odorous A to C (developed in April, 1958)), and films in which a sign of degradation was confirmed visually and by a sense of smell by the analysis method A and was consequently able to be confirmed visually and by a sense of smell (odorous A and B (developed in December, 1958)) were provided as the degraded films.

FIG. 1 shows the FT-IR spectrum as to three films, undegraded A, non-odorous A, and odorous A. Table 1 below shows the attribution of main peaks in the FT-IR spectrum obtained from FIG. 1.

TABLE 1

| Wave number/$cm^{-1}$ | Identification |
| --- | --- |
| 3300-3600 | O—H stretching |
| 1790-1850 | Acid anhydride C=O |
| 1720-1750 | Ester group C=O stretching |
| 1370 | C—H bending |
| 1220 | C—O—C antisymmetric stretching |
| 1050 | Pyranose ring C—O—C |

As shown in FIG. 1 and Table 1, a peak derived from acid anhydride C=O was observed at wave numbers from 1790 $cm^{-1}$ to 1850 $cm^{-1}$ in the non-odorous A and odorous A films. The peak derived from acid anhydride C=O was observed probably because acetic anhydride ascribable to the dehydration condensation of acetic acid molecules, or phthalic acid esters contained as plasticizers were eluted onto film surface to form phthalic anhydride. No peak derived from acid anhydride C=O was observed as to the undegraded A film, suggesting that neither the generation of acetic acid gas nor the elution of plasticizers occurred. Thus, the presence or absence of a peak derived from acid anhydride can be used as a reference of a film degradation index for TAC films.

Figure 2:
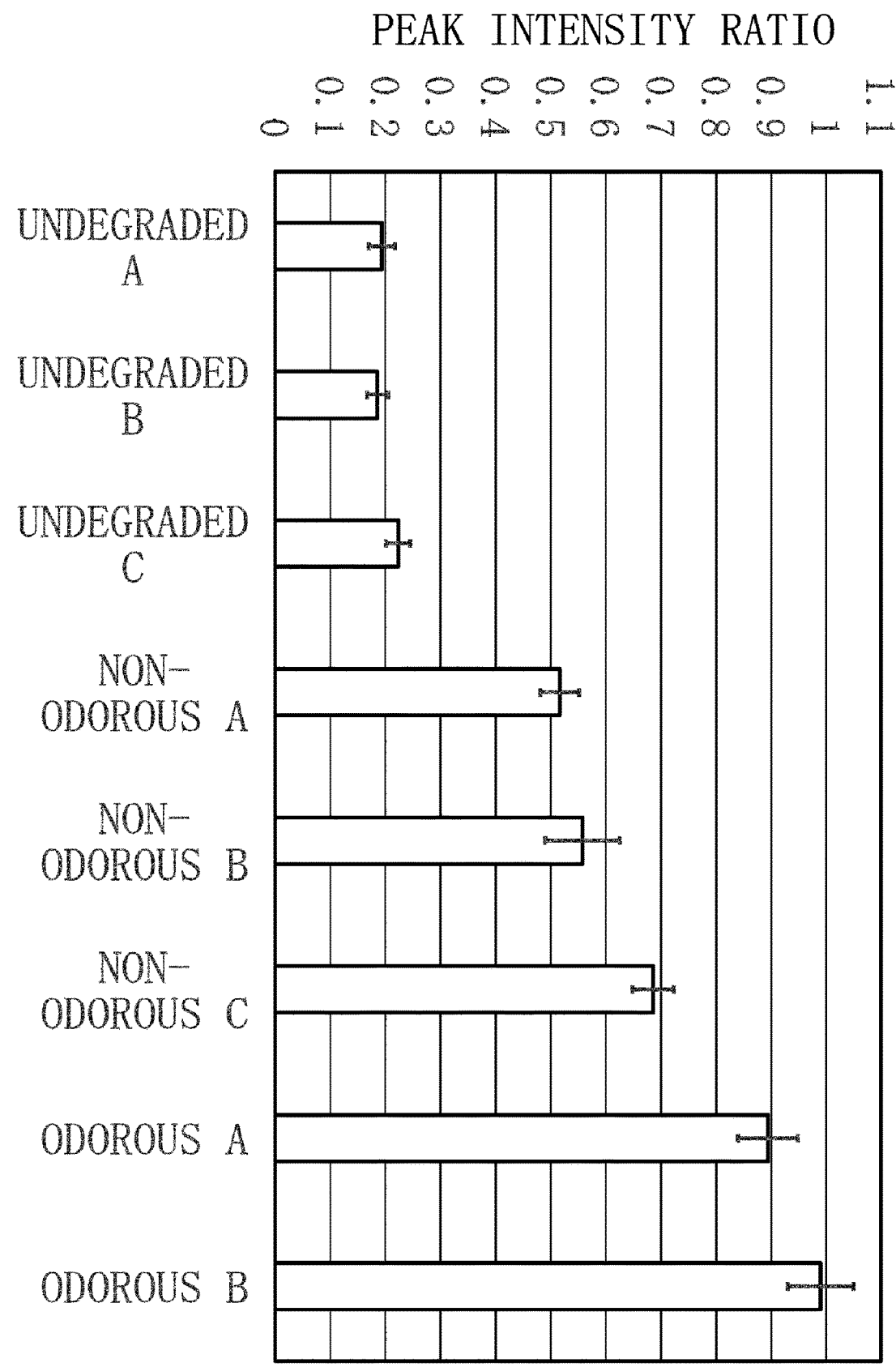
FIG. 2 is a diagram showing the peak intensity ratio of the FT-IR spectrum of the analysis method B according to the present embodiment.

FIG. 2 shows the peak intensity ratio of the FT-IR spectrum as to eight films, undegraded A to C, non-odorous A to C, and odorous A and B. This peak intensity ratio is a value obtained by dividing peak intensity derived from an OH group by peak intensity derived from a $CH_3$ group as to each TAC film. Specifically, the value was calculated by dividing peak intensity at a wave number of 3480 $cm^{-1}$ by peak intensity at a wave number of 1370 $cm^{-1}$. The error bars in the drawing depict standard deviation of the peak intensity ratio. FIG. 2 shows that the peak intensity ratio is larger in the order of the undegraded films, the non-odorous films, and the odorous films. This result was obtained probably because as the hydrolysis reaction of TAC progresses, the peak intensity derived from an OH group increases while the peak intensity of a bond derived from an acetyl group (e.g., a $CH_3$ group, a C=O group, and a C—O—O group) in TAC decreases. Accordingly, although the results obtained with a $CH_3$ group as a reference are shown in the present embodiment, peak intensity derived from a C—O—O group or a C=O group can also be used in the method for diagnosing degradation of a film according to the present invention. The degree of progression of degradation of the resin film may also be determined from such a peak intensity ratio.

The analysis method A and the analysis method B described above are effective for resin films whose degradation has progressed remarkably. When the degradation of the resin film can be confirmed using at least any non-destructive analysis method of the analysis method A and the analysis method B, further diagnosis of degradation is unnecessary.

The method for diagnosing degradation of a film according to the present invention preferably comprises using the following analysis method C and/or analysis method D, which is a non-destructive analysis method, after using the analysis method A and/or the analysis method B:

analysis method C: confirming the presence or absence of acetic acid attached to the film by pH measurement, and analysis method D: confirming the concentration of an acetic acid gas released from the film by HPLC analysis.

In the method for diagnosing degradation of a film according to the present invention, the degraded state of a resin film can be identified more reliably by using at least any non-destructive analysis method of the analysis method C and the analysis method D after using the analysis method A and/or the analysis method B as a non-destructive analysis method. Hereinafter, these analysis methods C and D will be described.

(C) Regarding Analysis Method C

The analysis method C involves confirming the presence or absence of acetic acid attached to the film by pH measurement, and is therefore effective when the degraded state of the resin film cannot be sufficiently confirmed using the analysis method A and/or the analysis method B. Hereinafter, the method for diagnosing film degradation using the analysis method C will be described in detail with reference to embodiments.

In the analysis method C according to the present embodiment, Portable pH Meter D-71 manufactured by HORIBA, Ltd. was used as an apparatus. Ultrapure water was collected from Direct-Q UV5, Pure Water Generation Unit Directly Connected To The Tap Water, manufactured by Merck Co., Ltd. 100 mL of ultrapure water was placed in a glass beaker, and a portion (3.5 cm wide×10 cm long) of a TAC film was dipped in the ultrapure water and left for 10 seconds, followed by the pH measurement of the dipping solution. Eight films, undegraded A to C, non-odorous A to C, and odorous A and B, shown in the analysis method B according to the foregoing embodiment were used as TAC films for use in measurement in the analysis method C according to the present embodiment.

Figure 3:
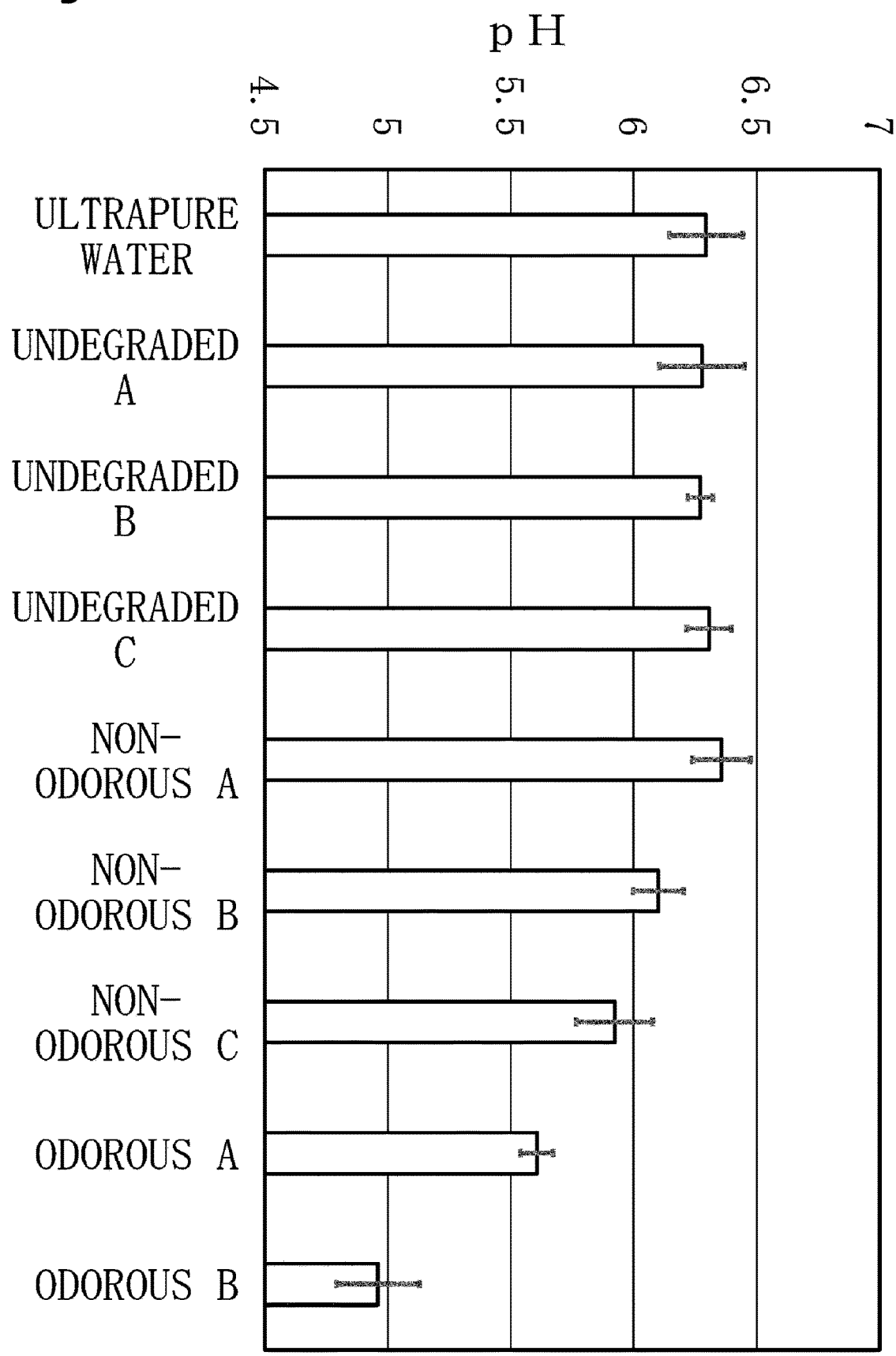
FIG. 3 is a diagram showing pH measurement results of the analysis method C according to the present embodiment.

FIG. 3 shows pH measurement results about eight films, undegraded A to C, non-odorous A to C, and odorous A and B. The error bars in the drawing depict standard deviation of the pH measurement results. As seen from FIG. 3, pH tends to decrease in the order of undegraded A to C, non-odorous A to C, and odorous A and B. This is probably because acetic acid molecules attached to the TAC film were dissolved into ultrapure water. In this context, the non-odorous B and C films had pH lower than that of the non-odorous A film, suggesting the possibility that the number of acetic acid molecules attached to the film was larger. Although the pH of ultrapure water is 7.0 in principle, the pH assumes a slightly acidic value (6.9 to 6.0) over time after collection from the ultrapure water generation apparatus because the ultrapure water immediately absorbs carbon dioxide in air. In the TAC film, the amount of acetic acid attached to its surface tends to increase by degradation. Therefore, pH of 6.0 or lower of water containing the dipped film can be interpreted as the progression of degradation. The degraded state of a resin film can be identified from the presence or absence of such attached acetic acid.

(D) Regarding Analysis Method D

The analysis method D involves confirming the concentration of an acetic acid gas released from the film by HPLC analysis, and is therefore effective when the degraded state of the resin film cannot be sufficiently confirmed using the analysis method A and/or the analysis method B. Hereinafter, the method for diagnosing film degradation using the analysis method D will be described in detail with reference to embodiments.

In the analysis method D according to the present embodiment, HPLC System Prominence LC-20A and UV-vis Detector SPD-20A manufactured by Shimadzu Corp. were used as apparatuses. Also, Shim-pack SCR-102H manufactured by Shimadzu GLC Ltd. was used as a column. Analysis conditions involved a 5.0 mM aqueous perchloric acid solution (pH 2.3) as a mobile phase, a flow rate of 1.5 mL/min, a UV detection wavelength of 210 nm, a cell temperature of 40° C., and a sample solution injection volume of 20 µL. Then, a hole was opened at the central part of the cap of a film conservation can (diameter: 27.8 cm, height: 4.5 cm) made of a galvanized steel plate, and sealed with a silicon rubber plug and a caulking agent, and a TAC film roll was placed in the film conservation can, which was then capped. After the can was left at room temperature for 1 week, a hole was opened in the silicon plug with an injection needle, and 60 mL of a gas within the can was recovered using a glass syringe (capacity: 100 mL) manufactured by Tsubasa Industry Co., Ltd., dissolved in 1 mL of ultrapure water, and used as a sample solution for HPLC measurement.

Since the area value of a peak observed at a retention time of approximately 7.1 min in a chromatogram is proportionate to an acetic acid concentration, the acetic acid gas concentration within the film conservation can was calculated from a calibration curve. The calibration curve was prepared by using acetic acid (special grade, purity: 99.7%) manufactured by FUJIFILM Wako Pure Chemical Corp. in measurement. Eight films, undegraded A to C, non-odorous A to C, and odorous A and B, shown in the analysis method B according to the foregoing embodiment were used as TAC films for use in measurement in the analysis method D according to the present embodiment.

Figure 4:
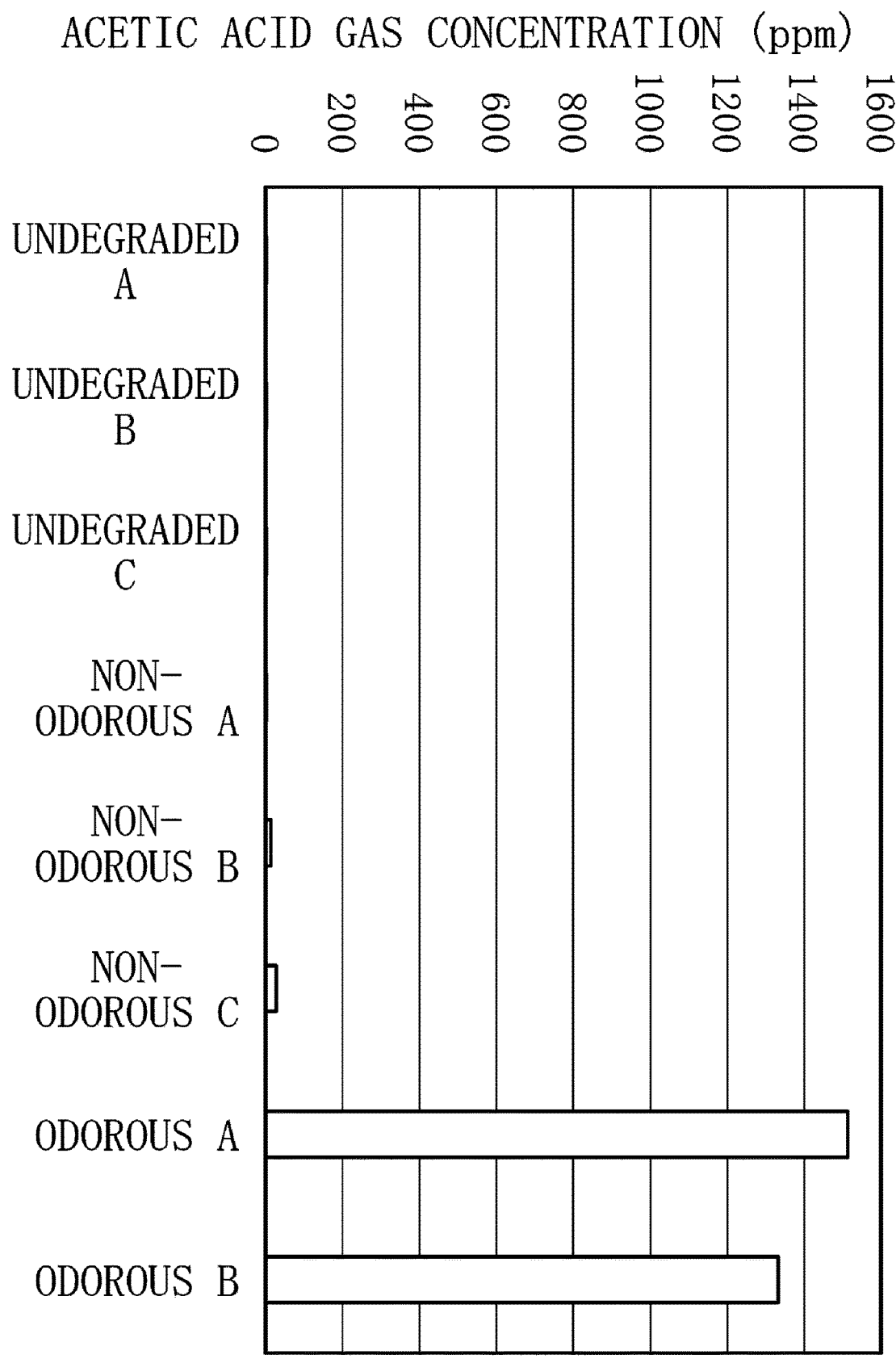
FIG. 4 is a diagram showing an acetic acid gas concentration within a film conservation can determined from the HPLC measurement of the analysis method D according to the present embodiment.

FIG. 4 shows an acetic acid gas concentration within the film conservation can determined by HPLC measurement as to eight films, undegraded A to C, non-odorous A to C, and odorous A and B. From FIG. 4, it was confirmed that no acetic acid gas was released into the film conservation can from the undegraded A to C and non-odorous A films. On the other hand, the release of acetic acid gas at approximately 14 ppm as to the non-odorous B film, approximately 28 ppm as to the non-odorous C film, and approximately 1300 to 1500 ppm as to the odorous A and B films was shown. The degraded state of a resin film can be identified by quantitatively evaluating such an acetic acid gas concentration during long-term storage within a conservation can by HPLC measurement.

The method for diagnosing degradation of a film according to the present invention preferably comprises using one of or a combination of two or more of the following analysis method E to analysis method H, which are destructive analysis methods, after using the non-destructive analysis method(s):

analysis method E: confirming a moisture content of the film with a KF moisture meter, analysis method F: confirming the heat stability of the film by thermogravimetry/differential thermal analysis (TG-DTA), analysis method G: confirming a plasticizer species in the film by pyrolysis gas chromatography mass spectrometry, and analysis method H: confirming the mechanical strength of the film by a tensile test.

In the method for diagnosing degradation of a film according to the present invention, the degraded state of a resin film can be identified further reliably by using at least any destructive analysis method of the destructive analysis methods (analysis method E to analysis method H) after using the non-destructive analysis method(s) (analysis method A to analysis method D). Hereinafter, these analysis methods E to H will be described.

(E) Regarding Analysis Method E

The analysis method E involves confirming a moisture content of the film with a KF moisture meter, and is therefore effective when the degraded state of the resin film cannot be sufficiently confirmed using the non-destructive analysis methods (analysis method A to analysis method D). Hereinafter, the method for diagnosing film degradation using the analysis method E will be described in detail with reference to embodiments.

In the analysis method E according to the present embodiment, KF Moisture Meter AQ-2100 and Moisture Vaporizer EV-5A manufactured by Hiranuma Co., Ltd. were used as apparatuses. For measurement, a TAC film sample was added to a heating furnace kept at 120° C., and the amount of moisture generated for 20 minutes was then quantified by the KF method. Eight films, undegraded A to C, non-odorous A to C, and odorous A and B, shown in the analysis method B according to the foregoing embodiment were used as TAC films for use in measurement in the analysis method E according to the present embodiment.

Figure 5:
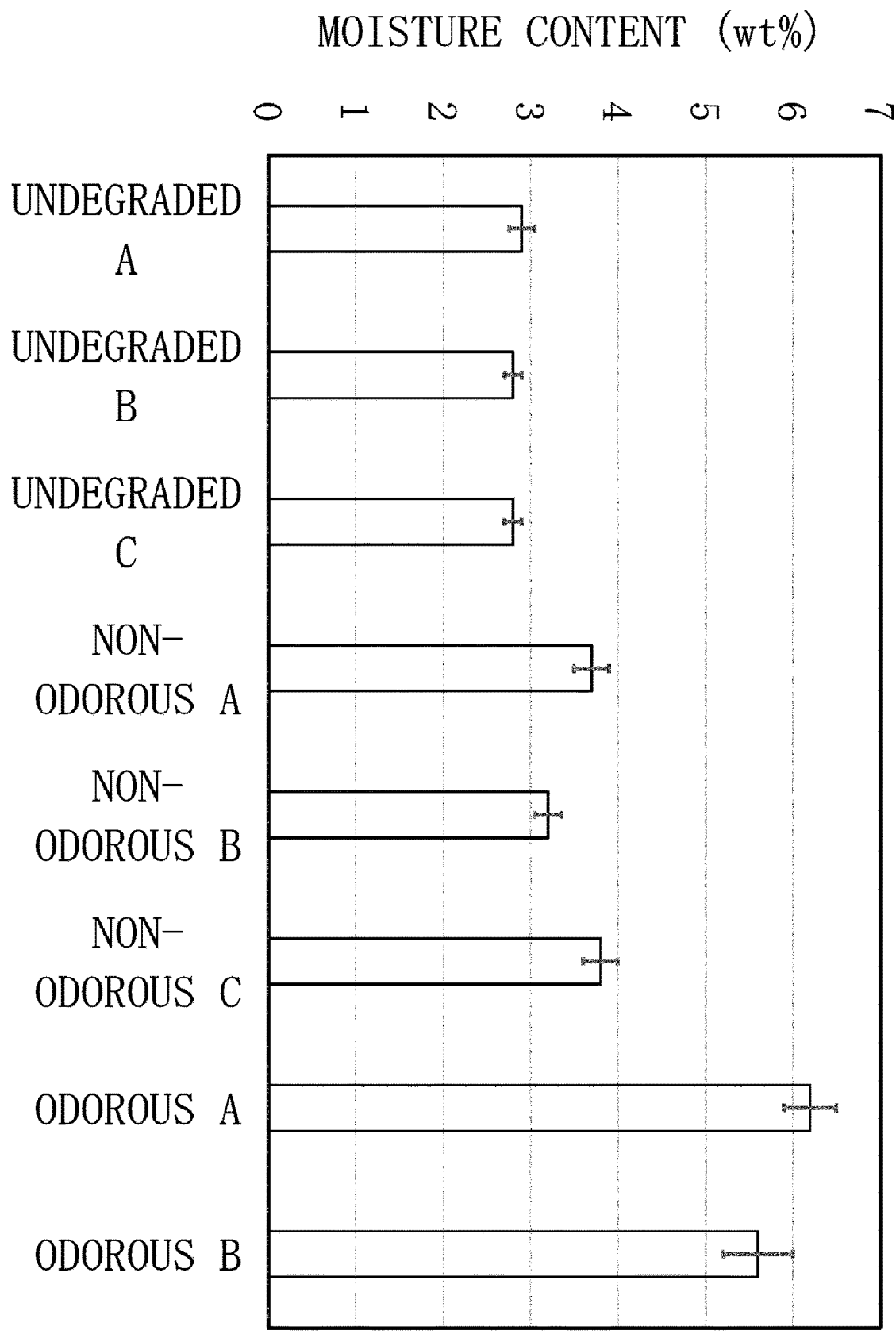
FIG. 5 is a diagram showing moisture content measurement results of the analysis method E according to the present embodiment.

FIG. 5 shows moisture content measurement results about eight films, undegraded A to C, non-odorous A to C, and odorous A and B. The error bars in the drawing depict standard deviation of the KF moisture measurement results. As is evident from FIG. 5, the moisture content of the film tends to increase as the degradation of the TAC film progresses. It is considered that when a TAC film is left in the atmosphere for a long period, moisture is attached to the base part of the TAC film or taken up into the image quality layer of the film. Hence, the moisture content probably decreased in the undegraded A to C films. Since the hydrolysis of TAC progresses at an accelerating pace once the reaction starts, it is considered that the odorous A and B films tend to easily take up moisture in a larger amount than that of the non-odorous A to C films.

It is known that as a resin film is degraded, its moisture content increases. Accordingly, a moisture percentage that exceeds a given value suggests that a film storage environment has a high relative humidity and is in a situation where hydrolysis will occur easily. According to the results shown in FIG. 5, a moisture content of 5.5 wt % in the film can be used as a reference of a degradation index of the film.

(F) Regarding Analysis Method F

The analysis method F involves confirming the heat stability of the film by TG-DTA analysis, and is therefore effective when the degraded state of the resin film cannot be sufficiently confirmed using the non-destructive analysis methods (analysis method A to analysis method D). Hereinafter, the method for diagnosing film degradation using the analysis method F will be described in detail with reference to embodiments.

In the analysis method F according to the present embodiment, Differential Thermal Balance Thermo plus EVO2 manufactured by Rigaku Corp. was used as an apparatus. Measurement conditions involved a flow rate of 100 mL/min in a $N_2$ gas atmosphere, a temperature increase rate of 20° C./min, a measurement temperature in the range of 25 to 450° C., an α-alumina powder manufactured by Rigaku Corp. as a reference, Al as a sample pan, and a data obtainment interval of 1.0 s. A TAC film and the reference were placed in a sample room, to which $N_2$ gas was then injected for approximately 15 minutes. Measurement was initiated after the mass was confirmed to reach a stationary state. Eight films, undegraded A to C, non-odorous A to C, and odorous A and B, shown in the analysis method B according to the foregoing embodiment were used as TAC films for use in measurement in the analysis method F according to the present embodiment.

Figure 6:
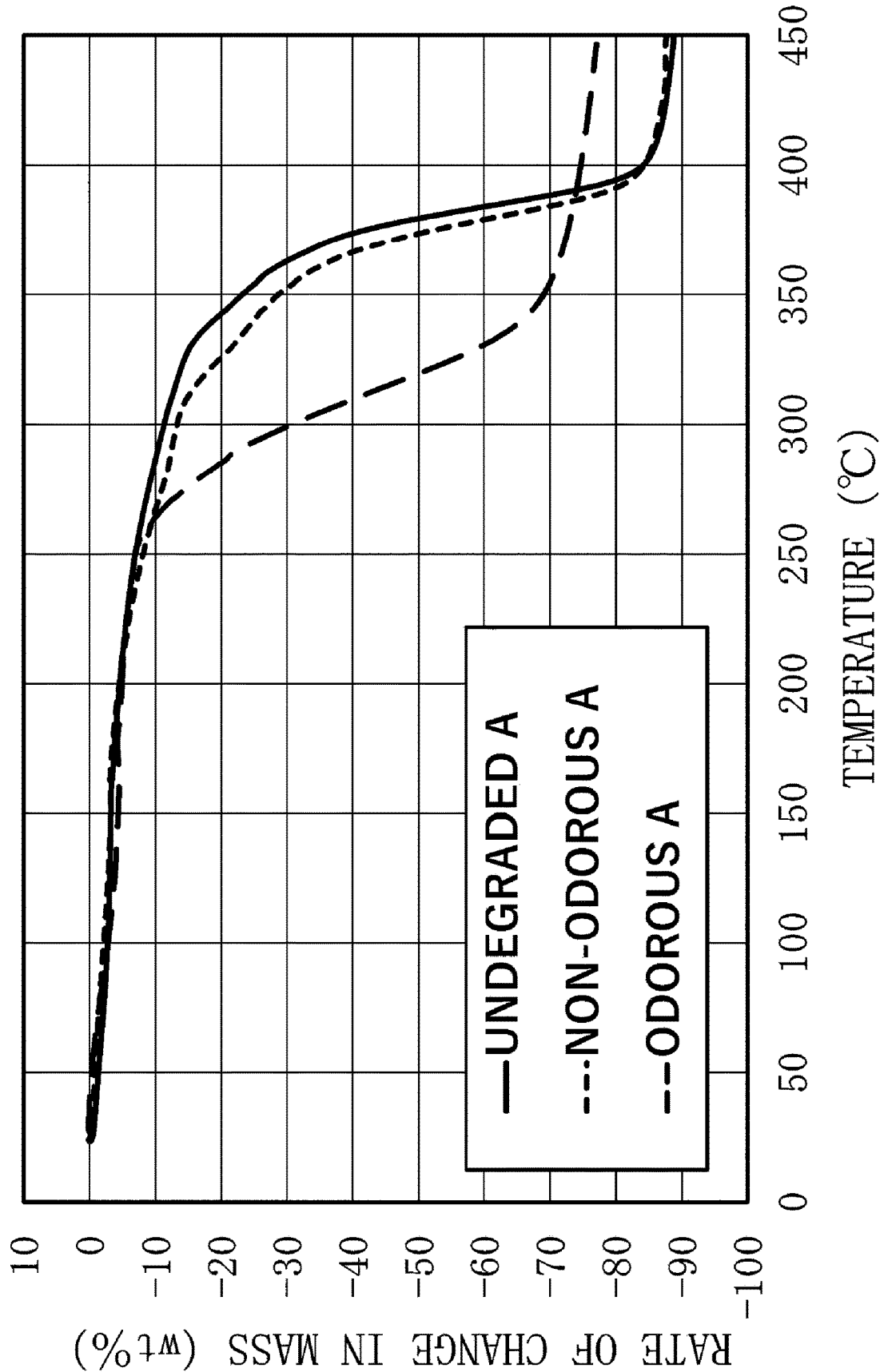
FIG. 6 is a diagram showing TG curve measurement results of the analysis method F according to the present embodiment.

FIG. 6 shows TG curve measurement results about three films, undegraded A, non-odorous A, and odorous A. As seen from FIG. 6, mass decrease tended to start to occur on the low temperature side as the degradation of the TAC film progressed. Here, the TG curve was differentiated based on time, and a temperature that attained the largest slope of the tangent of the TG curve was regarded as a pyrolysis peak temperature and compared among the films.

Figure 7:
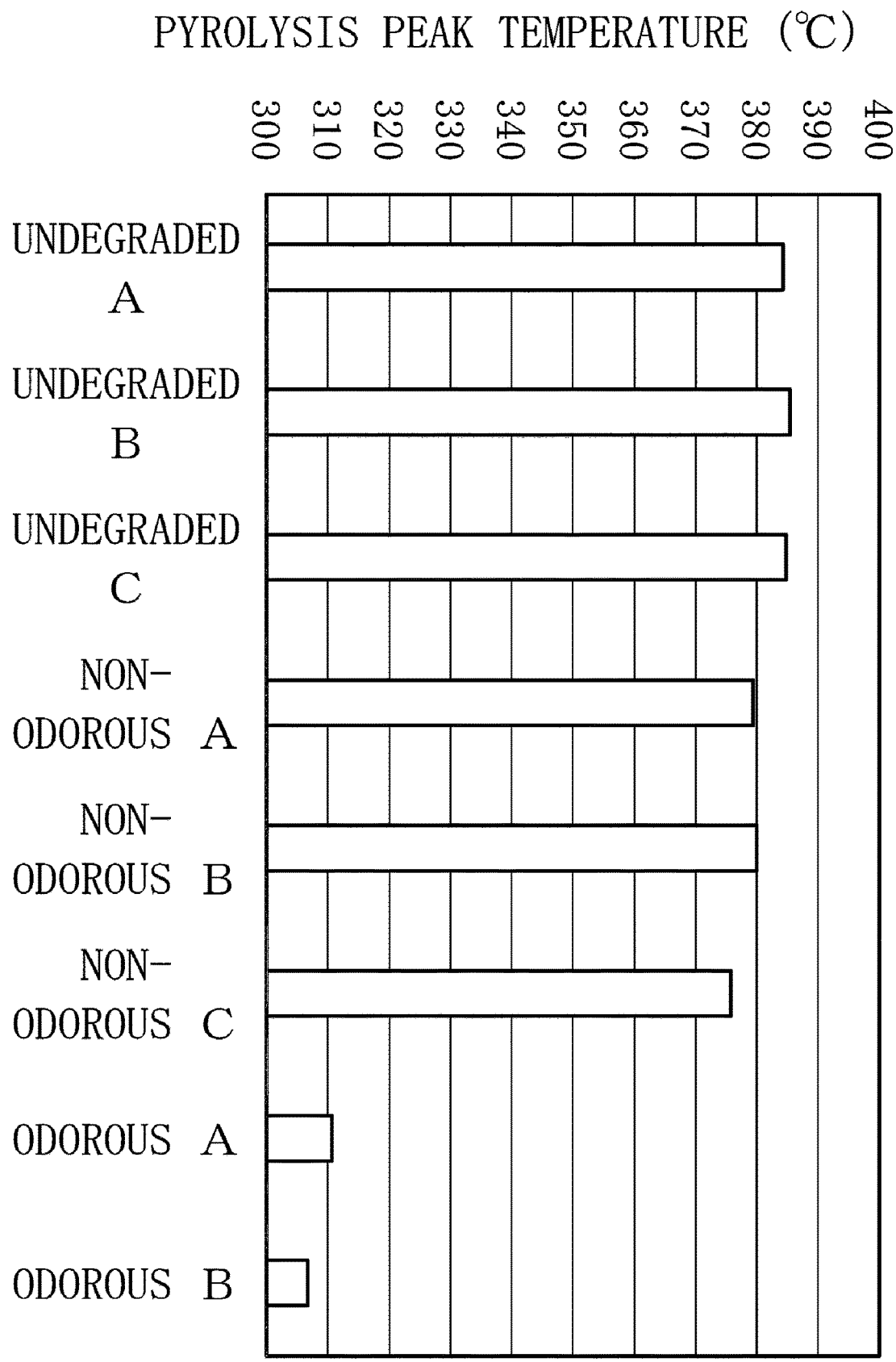
FIG. 7 is a diagram showing the pyrolysis peak temperature of the analysis method F according to the present embodiment.

FIG. 7 shows the pyrolysis peak temperature of the TAC film determined from the TG curve as to eight films, undegraded A to C, non-odorous A to C, and odorous A and B. As seen from FIG. 7, the pyrolysis peak temperature tended to decrease as the degradation of the TAC film progressed. It is also evident that the non-odorous A to C films had a pyrolysis peak temperature lower by approximately 5° C. than that of the undegraded A to C films. This is probably because the backbone of TAC was cleaved with time-dependent degradation, leading to a decreased degree of polymerization.

Thus, in the TAC film, a pyrolysis peak temperature that falls below a given value suggests the progression of oxidation reaction or plasticizer elution due to a decreased degree of polymerization associated with backbone cleavage in the resin structure. The degraded state of a resin film can be quantitatively determined by focusing on such a pyrolysis peak temperature. The pyrolysis peak temperature is conveniently calculable using software without the need of drawing a baseline, etc., and can therefore be regarded as an index with less reading error.

(G) Regarding Analysis Method G

The analysis method G involves confirming a plasticizer species in the film by Py-GC/MS analysis, and is therefore effective when the degraded state of the resin film cannot be sufficiently confirmed using the non-destructive analysis methods (analysis method A to analysis method D). Hereinafter, the method for diagnosing film degradation using the analysis method G will be described in detail with reference to embodiments.

In the analysis method G according to the present embodiment, GC-MS System 7890B/5977B manufactured by Agilent Technologies Japan, Ltd. and Multi-Shot Pyrolyzer EGA/PY-3030D manufactured by Frontier Laboratories Ltd. were used as apparatuses. Also, UA$^+$-5 manufactured by Frontier Laboratories Ltd. or ZB-MultiResidue-1 or ZB-xLB-HT Inferno manufactured by Phenomenex Inc. was used as a column. A TAC film was analyzed using these apparatuses and the column. GC conditions involved an injection port temperature of 300° C., He as a carrier gas, a column flow rate of 1.2 mL/min (constant flow mode), a split ratio of 50:1, a heating furnace temperature of 550° C., an ITF temperature of 300° C., and an oven temperature of 40° C. (2 min) increased at 20° C./min to 300° C. (5 min). MS conditions involved an electronic ionization method (70 eV) as an ionization method, an ion source temperature of 250° C., a quadrupole temperature of 150° C., an interface temperature of 250° C., a scan range of m/z 29 to 400 (sampling: 3), and a gain of 1. Eight films, undegraded A to C, non-odorous A to C, and odorous A and B, shown in the analysis method B according to the foregoing embodiment were used as TAC films for use in measurement in the analysis method G according to the present embodiment.

Figure 8:
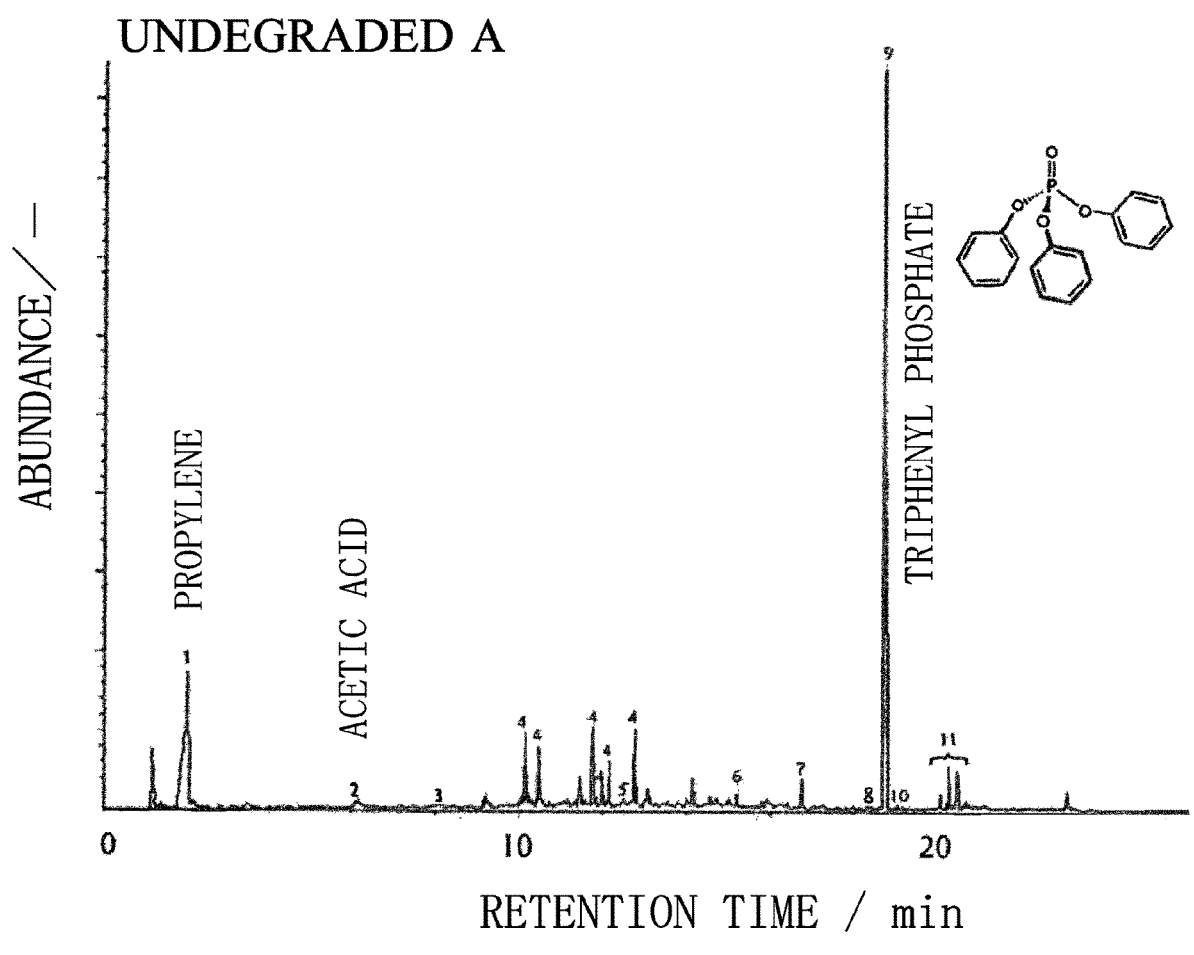
FIG. 8 is a diagram showing Py-GC/MS measurement results (undegraded A film) of the analysis method G according to the present embodiment.
Figure 9:
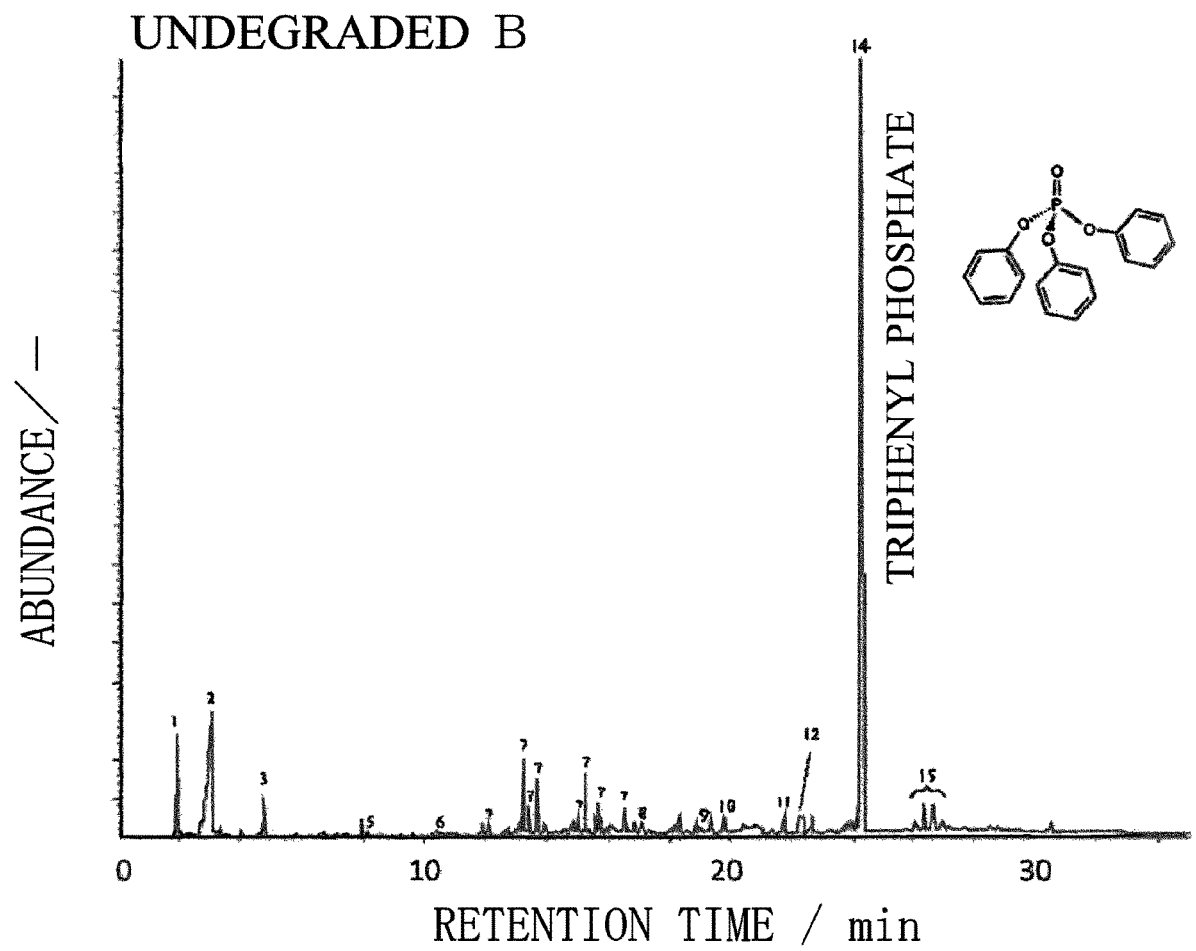
FIG. 9 is a diagram showing Py-GC/MS measurement results (undegraded B film) of the analysis method G according to the present embodiment.
Figure 10:
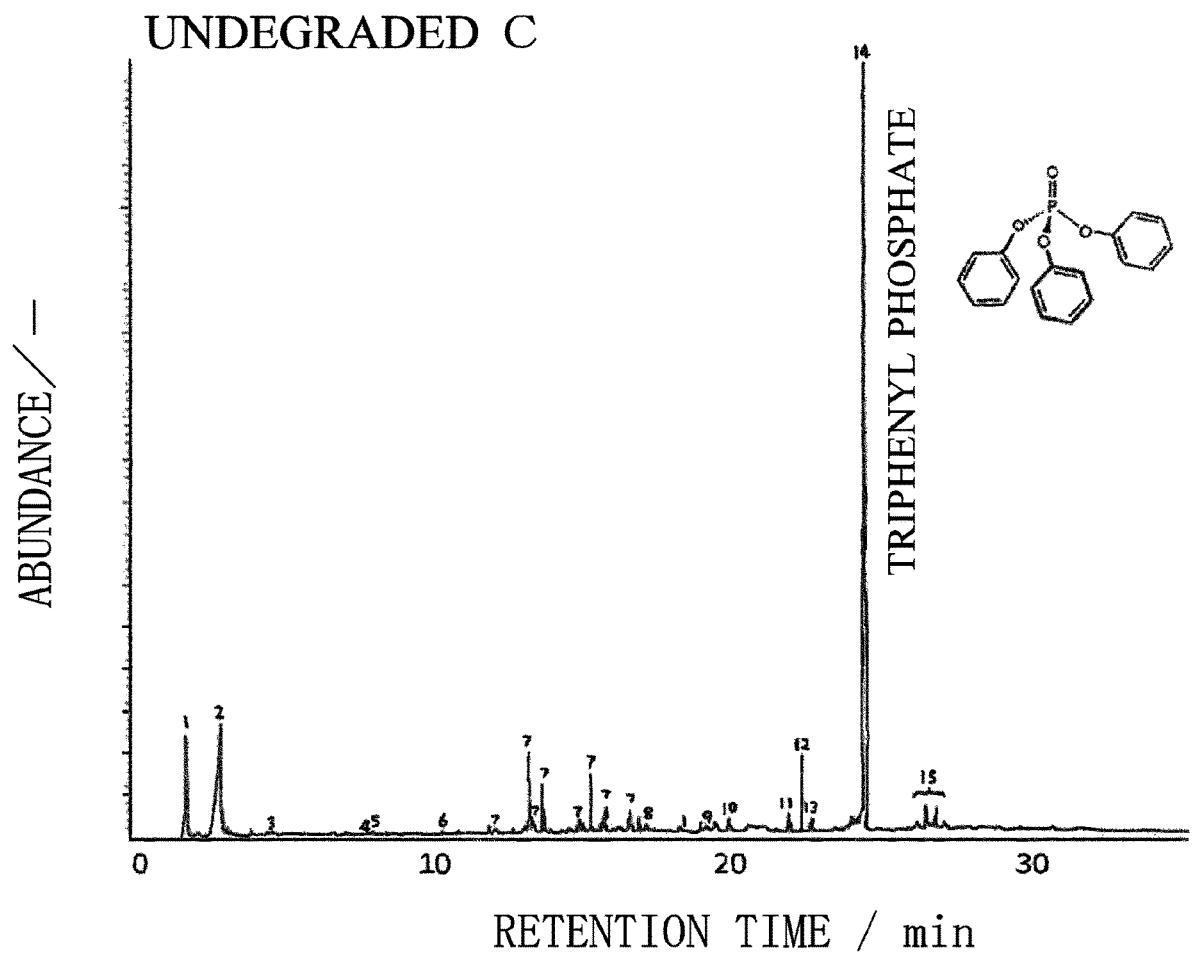
FIG. 10 is a diagram showing Py-GC/MS measurement results (undegraded C film) of the analysis method G according to the present embodiment.
Figure 11:
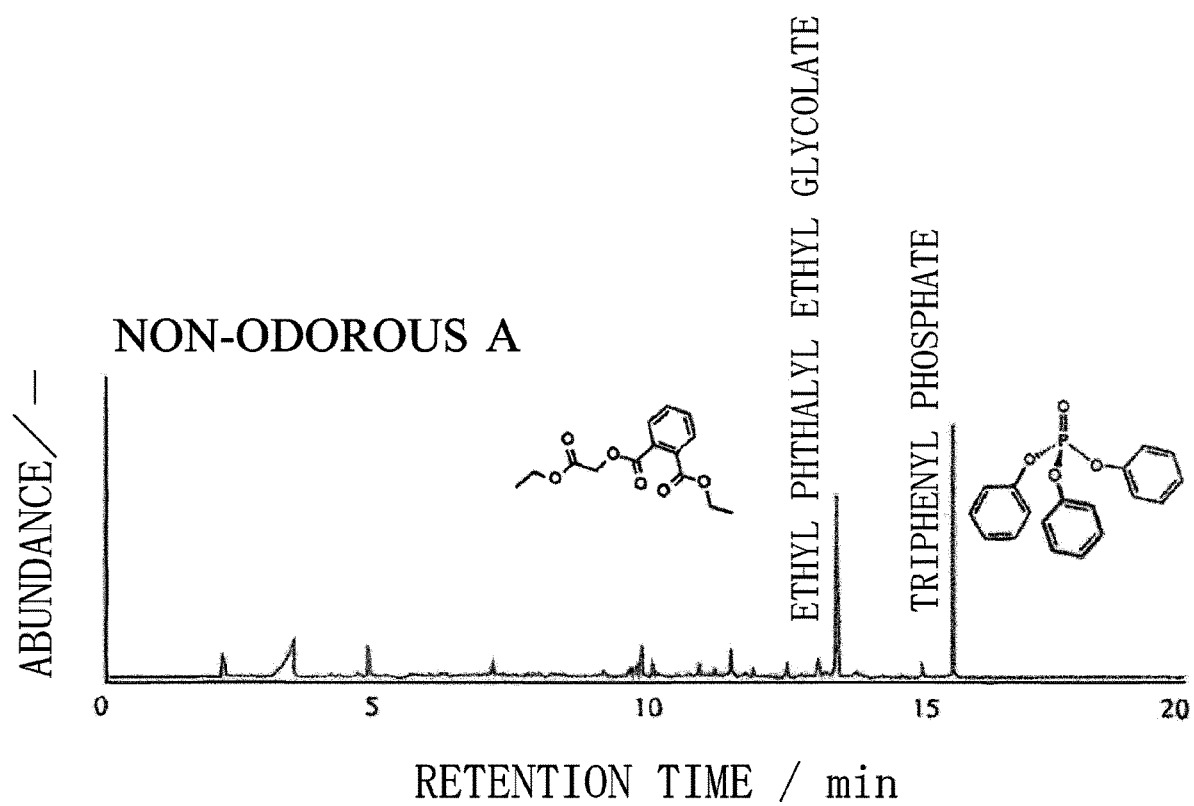
FIG. 11 is a diagram showing Py-GC/MS measurement results (non-odorous A film) of the analysis method G according to the present embodiment.
Figure 12:
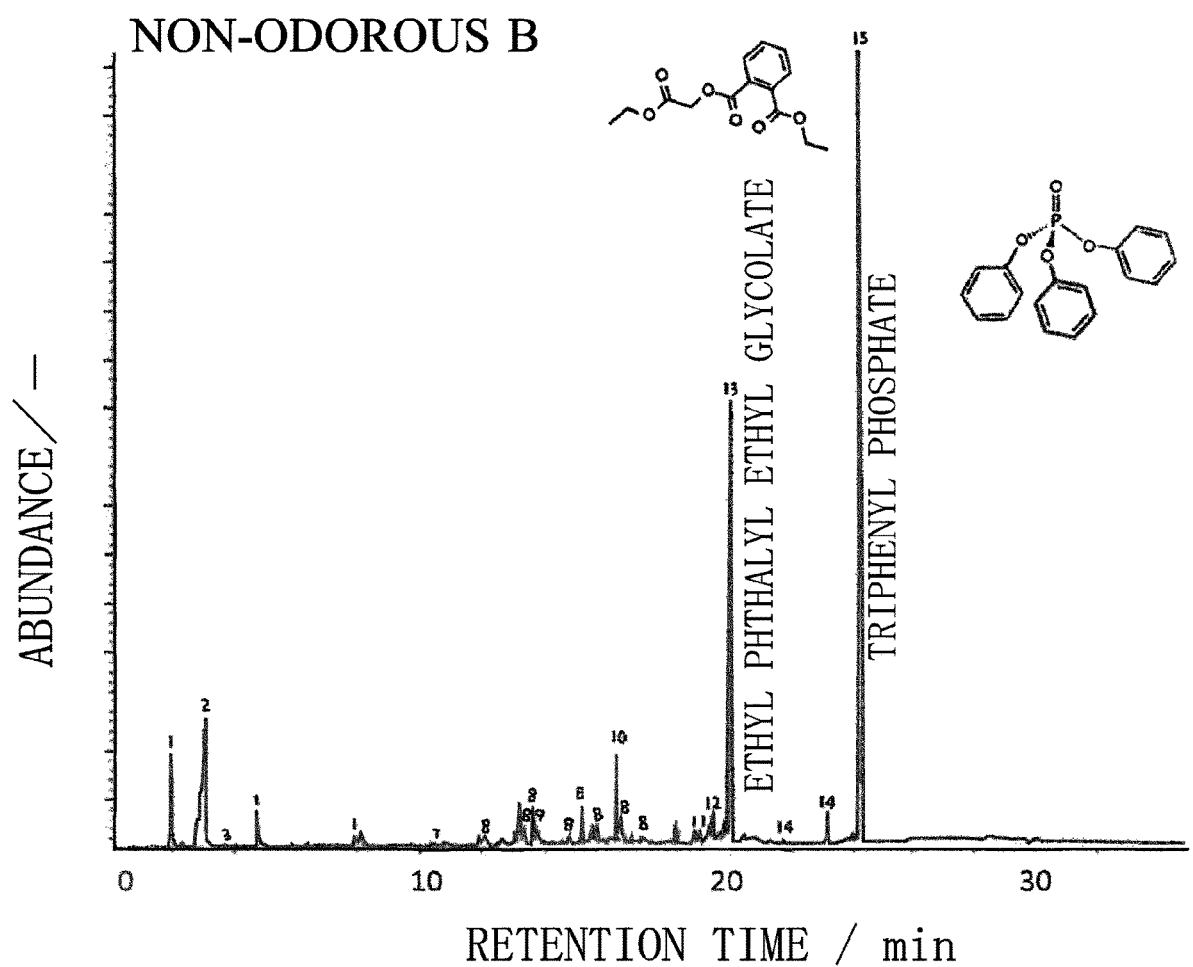
FIG. 12 is a diagram showing Py-GC/MS measurement results (non-odorous B film) of the analysis method G according to the present embodiment.
Figure 13:
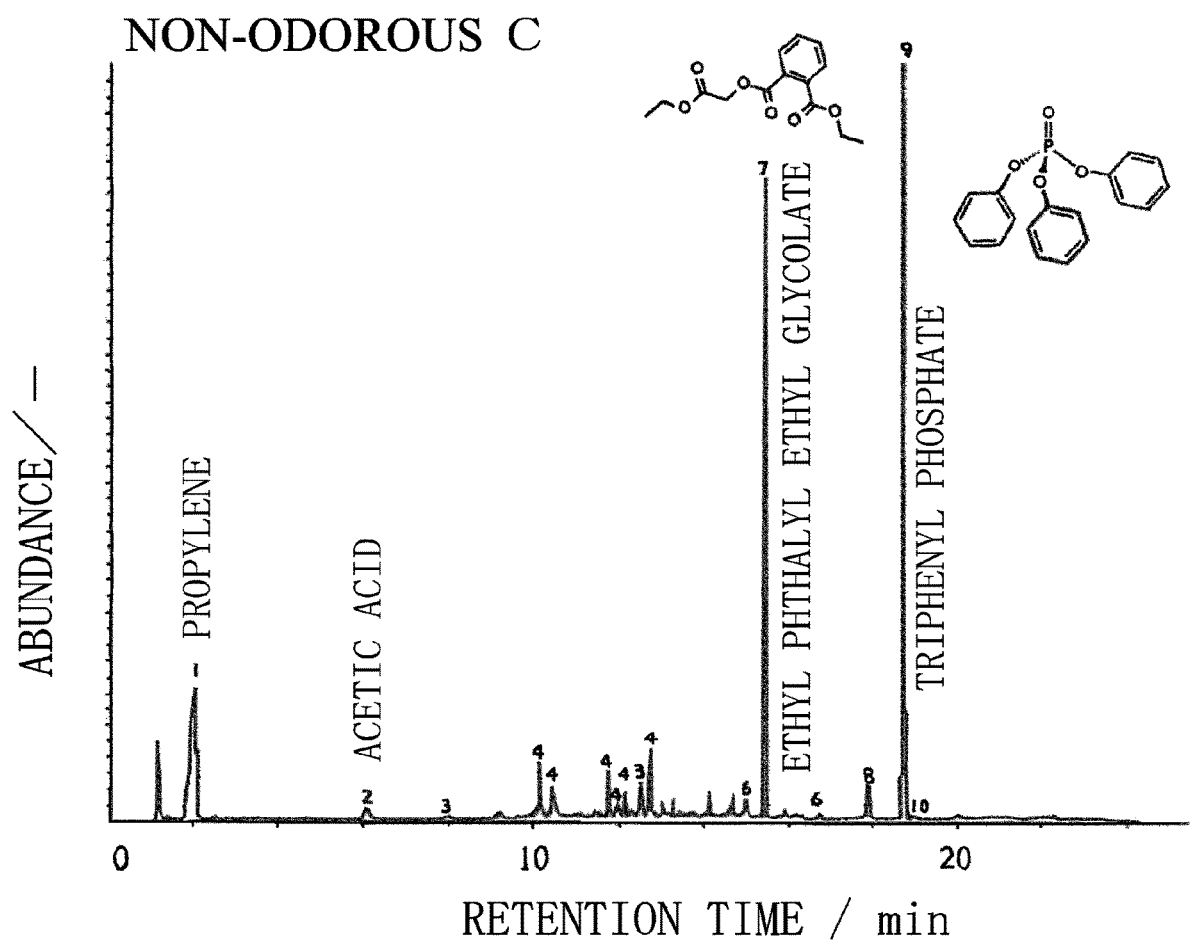
FIG. 13 is a diagram showing Py-GC/MS measurement results (non-odorous C film) of the analysis method G according to the present embodiment.
Figure 14:
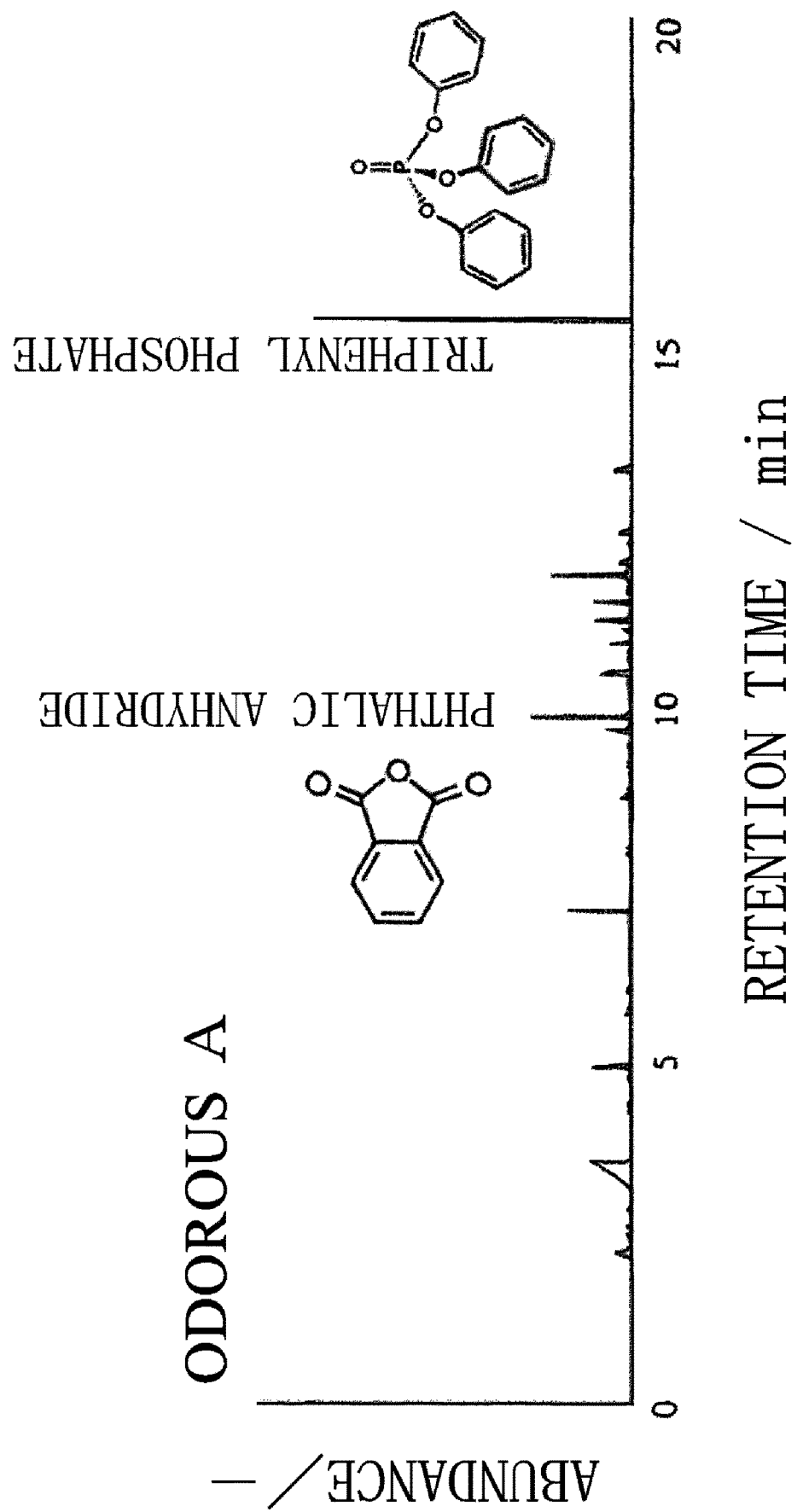
FIG. 14 is a diagram showing Py-GC/MS measurement results (odorous A film) of the analysis method G according to the present embodiment.
Figure 15:
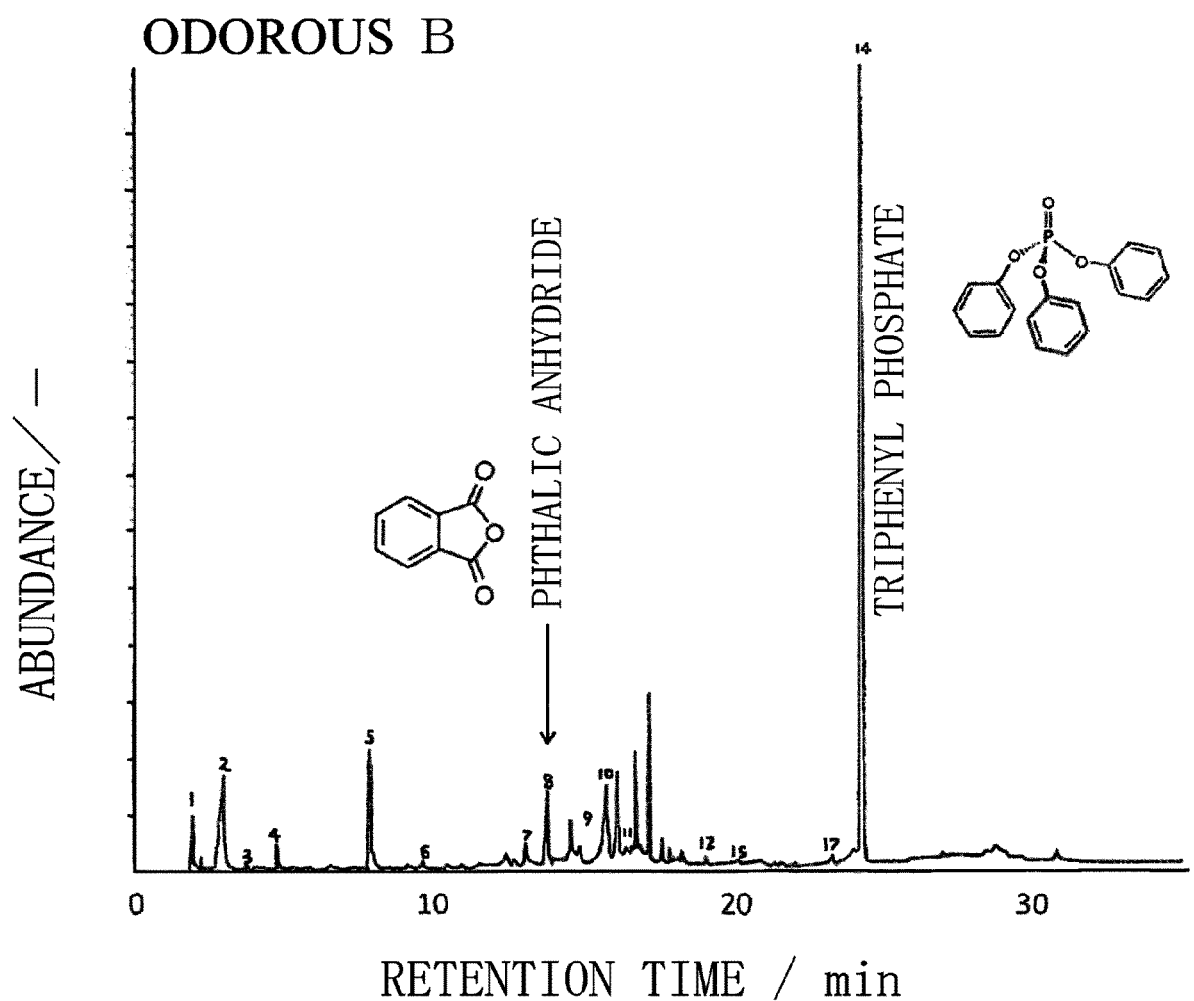
FIG. 15 is a diagram showing Py-GC/MS measurement results (odorous B film) of the analysis method G according to the present embodiment.

FIGS. 8, 9 and 10 show Py-GC/MS measurement results about the undegraded A, undegraded B and undegraded C films, respectively. FIGS. 11, 12 and 13 show Py-GC/MS measurement results about the non-odorous A, non-odorous B and non-odorous C films, respectively. FIGS. 14 and 15 show Py-GC/MS measurement results about the odorous A and odorous B films, respectively. In FIGS. 8 to 15, triphenyl phosphate were detected as to all the films. Also, ethyl phthalyl ethyl glycolate was detected in the non-odorous A to C films, whereas it was not detected in the undegraded A to C and odorous A and B films. Further, phthalic anhydride was detected in the odorous A and B films. This was probably formed by the decomposition of ethyl phthalyl ethyl glycolate with degradation. These results suggested that the presence or absence of ethyl phthalyl ethyl glycolate is involved in the progression of degradation.

Thus, the analysis method G according to the present embodiment produced results showing that ethyl phthalyl ethyl glycolate was contained as a plasticizer in the TAC film, suggesting the possibility that its content is related to film degradation. Such Py-GC/MS is characterized as an approach of qualitatively analyzing whether a plasticizer in a resin film is vaporized or decomposed to determine the presence or absence of the progression of degradation, and is thus effective for evaluating the presence or absence of precipitates derived from a plasticizer or whether to contain a plasticizer necessary for measures against degradation.

(H) Regarding Analysis Method H

The analysis method H involves confirming the mechanical strength of the film by a tensile test, and is therefore effective when the degraded state of the resin film cannot be sufficiently confirmed using the non-destructive analysis methods (analysis method A to analysis method D). Hereinafter, the method for diagnosing film degradation using the analysis method H will be described in detail with reference to embodiments.

In the analysis method H according to the present embodiment, Desktop Precision Universal Tester Autograph AGS-X manufactured by Shimadzu Corp. and SD Lever Type Sample Cutting Machine SDL-100 manufactured by Dumbbell Co., Ltd. were used as apparatuses. Measurement conditions involved a load cell of 1 kN, a testing speed of 10 mm/min, and a distance of 20 mm between grips. A TAC film cut into JIS K 6251 No. 7 dumbbell shape was used as a film sample, and stress at break (breaking force) was measured. Eight films, undegraded A to C, non-odorous A to C, and odorous A and B, shown in the analysis method B according to the foregoing embodiment were used as TAC films for use in measurement in the analysis method H according to the present embodiment.

Figure 16:
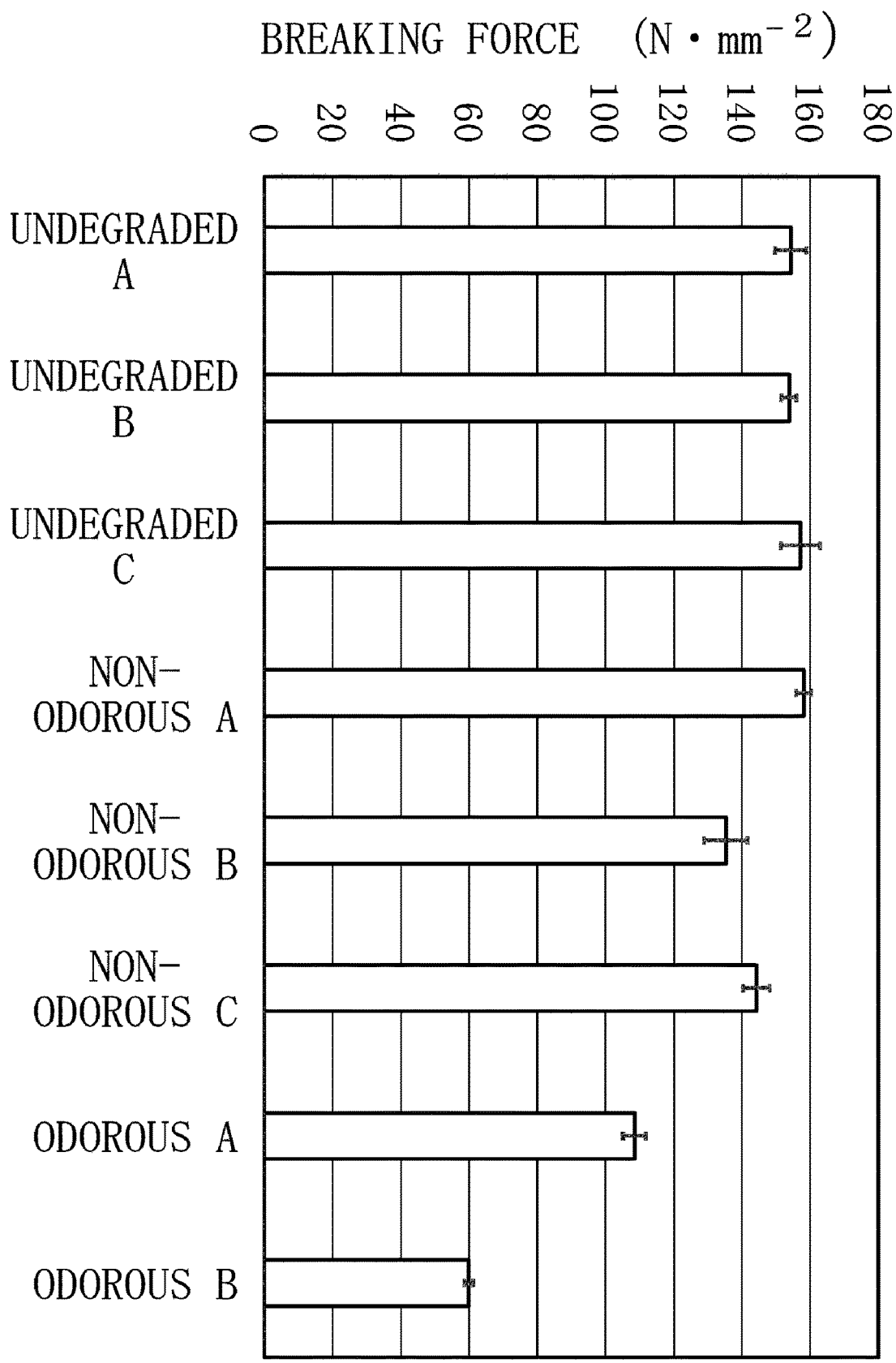
FIG. 16 is a diagram showing a stress value at film break obtained from the tensile test of the analysis method H according to the present embodiment.

FIG. 16 shows the stress value at film break obtained from the tensile test as to eight films, undegraded A to C, non-odorous A to C, and odorous A and B. The error bars in the drawing depict standard deviation of the stress value at film break. As shown in FIG. 16, the breaking force tended to decrease as hydrolysis progressed in the TAC film. The non-odorous B and C films compared with the undegraded A to C and non-odorous A films had smaller breaking force. This is probably due to decrease in plasticizer content, decrease in molecular weight associated with TAC backbone cleavage, etc., suggesting that such degradation occurs, in addition to hydrolysis reaction, in the time-dependent degraded TAC film.

It is generally known that mechanical strength decreases by the degradation of a polymer. Accordingly, according to the results shown in FIG. 16, breaking strength of 120 N/mm$^2$ or less can be used as a reference of a degradation index of the TAC film. Aside from chemical analysis approaches, the degraded state of a resin film can also be evaluated by such a tensile test from the viewpoint of physical strength.

In the method for diagnosing film degradation according to the present invention, the resin film mentioned above is preferably a TAC film. The TAC film has high flame resistance and is capable of being conserved for a long period and as such, can be suitably used as a film for record conservation. Furthermore, the TAC film compared with other resin films can remarkably enhance safety and reliability as a film for record conservation because its degraded state can be identified efficiently and reliably by the method for diagnosing film degradation according to the present invention.

The embodiments of the method for diagnosing film degradation according to the present invention are described above. However, the method for diagnosing film degradation according to the present invention can achieve higher accuracy of determination of resin film degradation than ever by assessment in a complementary manner using results of a plurality of analyses in combination.

Figure 17:
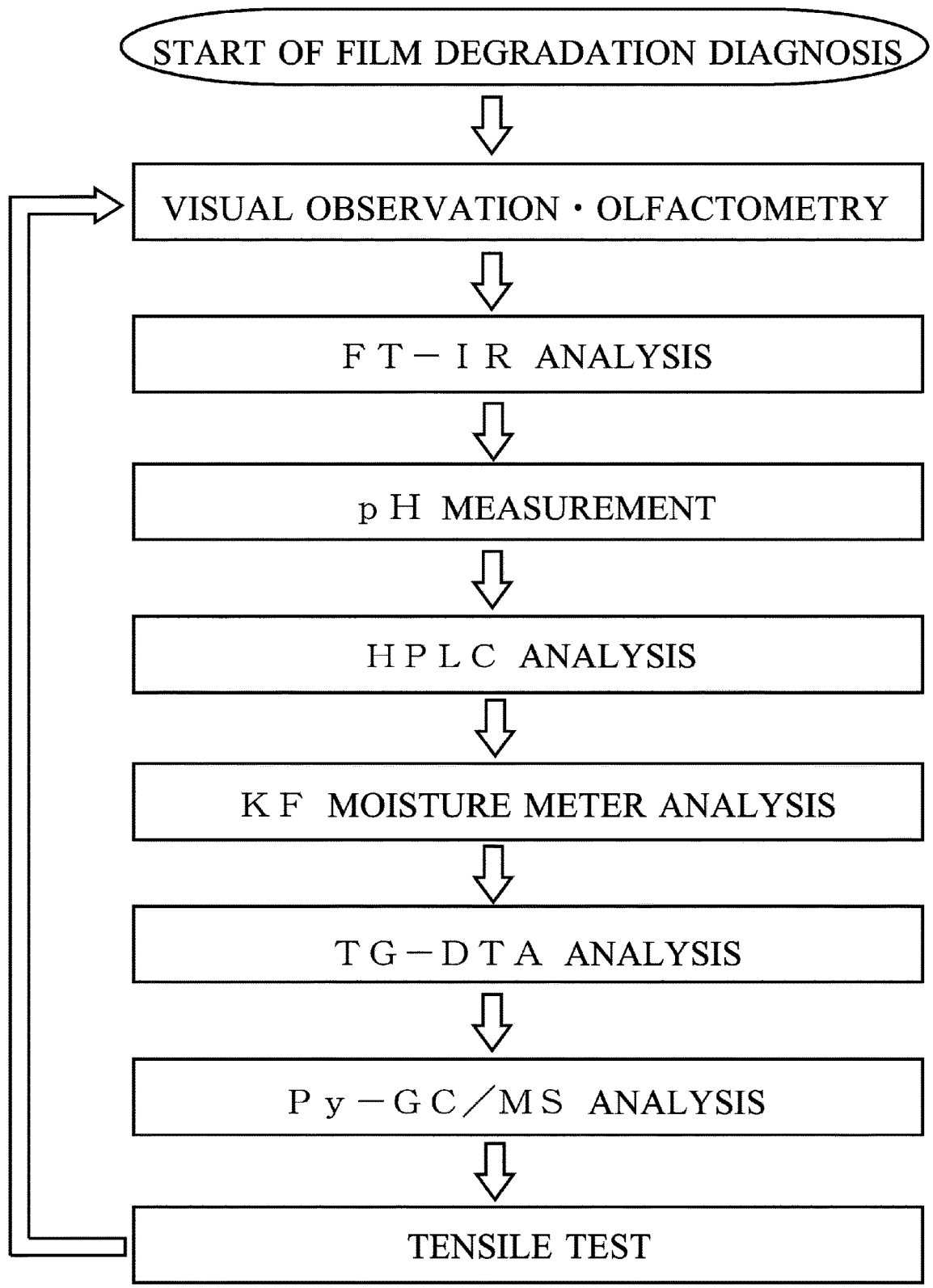
FIG. 17 is a chart showing the summary of the method for diagnosing film degradation according to the present embodiment.

FIG. 17 is a chart showing the summary of the method for diagnosing film degradation according to the present embodiment. In the method for diagnosing film degradation according to the present invention, information obtained as to each individual analysis item is defined, and the degraded state is determined on the basis of whether or not the analysis results exceed (or fall below) a given threshold. Accordingly, the method for diagnosing film degradation according to the present invention can perform degradation diagnosis comprehensively and highly accurately by performing a plurality of analysis methods in a staged manner. The analysis procedures shown in FIG. 17 take the order of the analysis methods A to H mentioned above. However, in the method for diagnosing film degradation according to the present invention, the procedures do not have to be performed in the same order thereas, and it is not necessarily required to carry out all the analysis methods. Hence, the method for diagnosing film degradation according to the present invention enables degradation to be diagnosed efficiently.

INDUSTRIAL APPLICABILITY

According to the present invention, the degraded state of a resin film can be identified more efficiently and reliably than ever. Thus, measures against the degradation of resin films can be taken instantaneously and can prevent the disappearance of valuable historical materials, documents, and the like recorded in films.

The invention claimed is:

1. A method for diagnosing degradation of a film based on triacetyl cellulose, the method comprising using the following analysis method B, which is a non-destructive analysis method:

analysis method B: confirming presence or absence of a peak derived from acid anhydride at wave numbers from 1790 $cm^{-1}$ to 1850 $cm^{-1}$ of the film by Fourier transform infrared spectroscopy analysis.

2. The method for diagnosing degradation of a film according to claim 1, further comprising using the following analysis method D, which is a non-destructive analysis method, after using the analysis method B:

analysis method D: confirming a concentration of an acetic acid gas released from the film by high-performance liquid chromatography analysis.

3. The method for diagnosing degradation of a film according to claim 1, further comprising using one of or a combination of two or more of the following analysis method E to analysis method H, which are destructive analysis methods, after using the non-destructive analysis method(s):

analysis method E: confirming a moisture content of the film with a Karl Fischer moisture meter, analysis method F: confirming a heat stability of the film by thermogravimetry/differential thermal analysis, analysis method G: confirming a plasticizer species in the film by pyrolysis gas chromatography mass spectrometry, and analysis method H: confirming a mechanical strength of the film by a tensile test.

4. The method for diagnosing degradation of a film according to claim 2, further comprising using one of or a combination of two or more of the following analysis method E to analysis method H, which are destructive analysis methods, after using the non-destructive analysis method(s):

analysis method E: confirming a moisture content of the film with a Karl Fischer moisture meter, analysis method F: confirming a heat stability of the film by thermogravimetry/differential thermal analysis, analysis method G: confirming a plasticizer species in the film by pyrolysis gas chromatography mass spectrometry, and analysis method H: confirming a mechanical strength of the film by a tensile test.

* * * * *